March 22, 1955 A. F. HICKMAN 2,704,664
SPRING SUSPENSION FOR VEHICLES
Filed Dec. 7, 1951 5 Sheets-Sheet 2
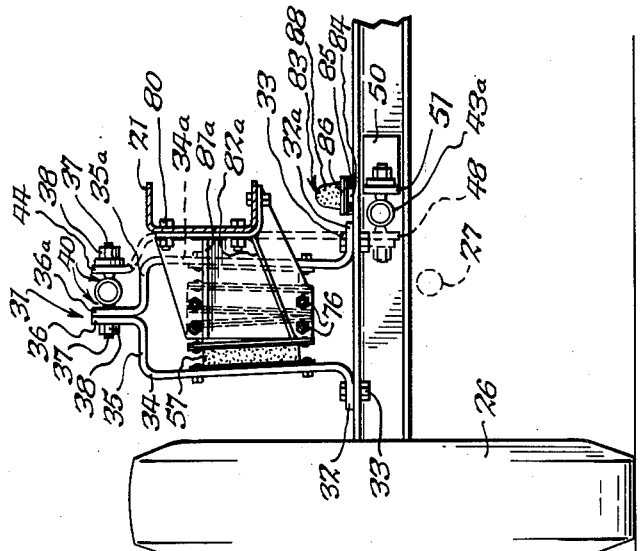
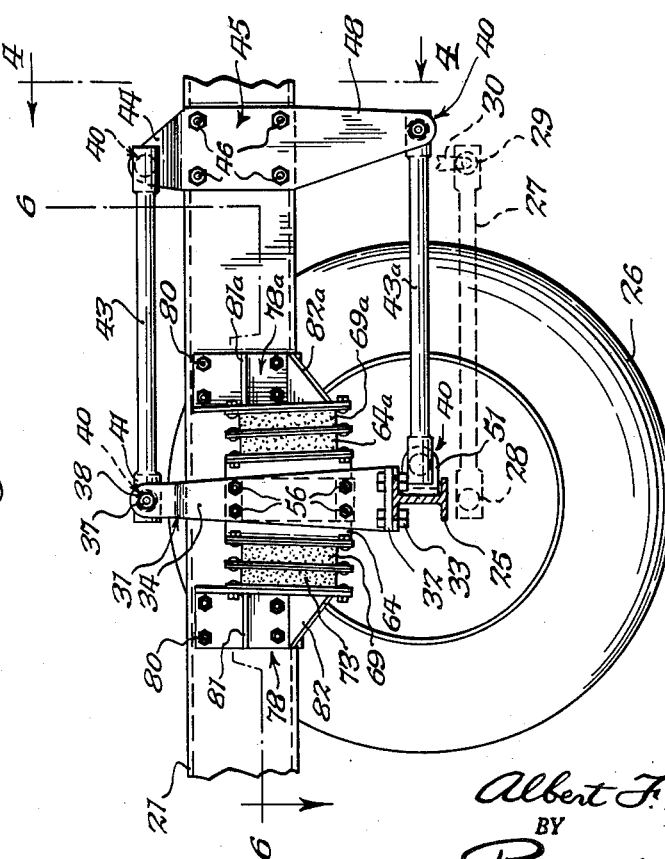
INVENTOR.
Albert F. Hickman
BY
Popp and Sommer
Attorneys.

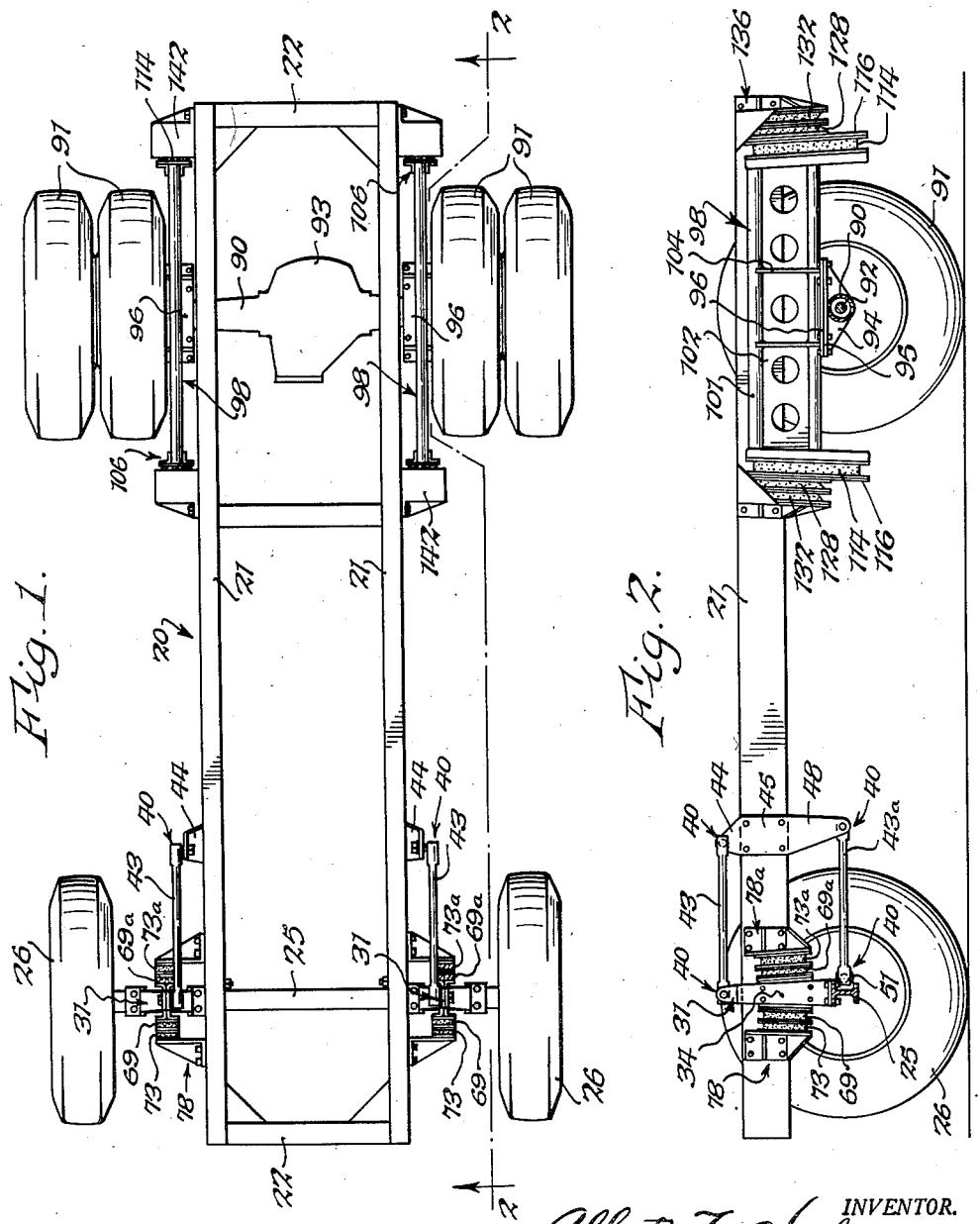

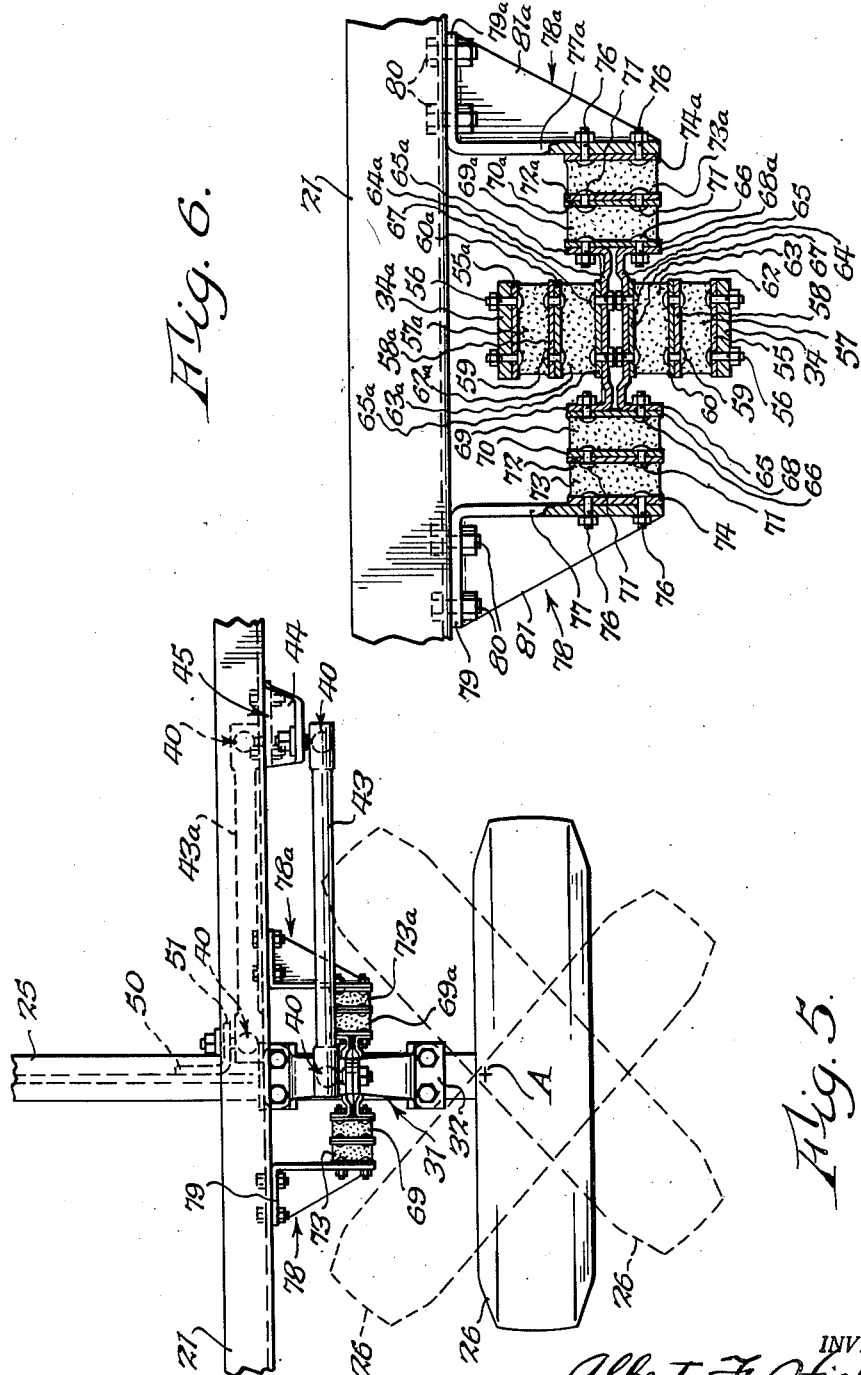

March 22, 1955  A. F. HICKMAN  2,704,664
SPRING SUSPENSION FOR VEHICLES
Filed Dec. 7, 1951  5 Sheets-Sheet 4
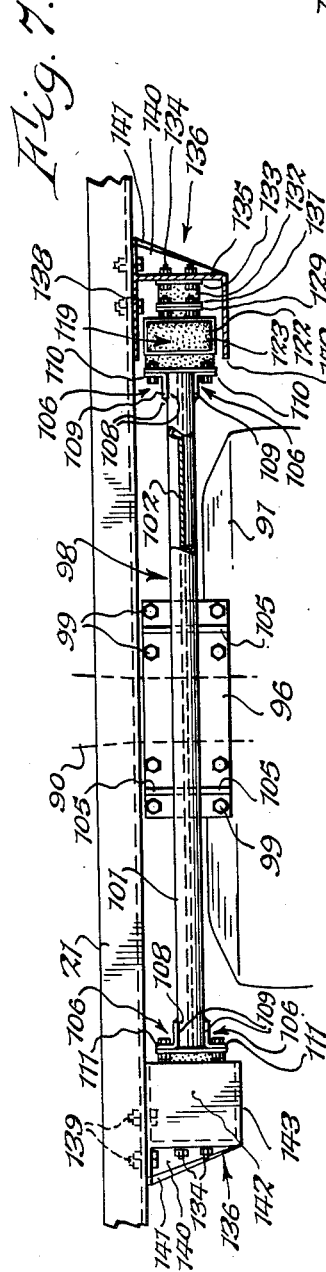
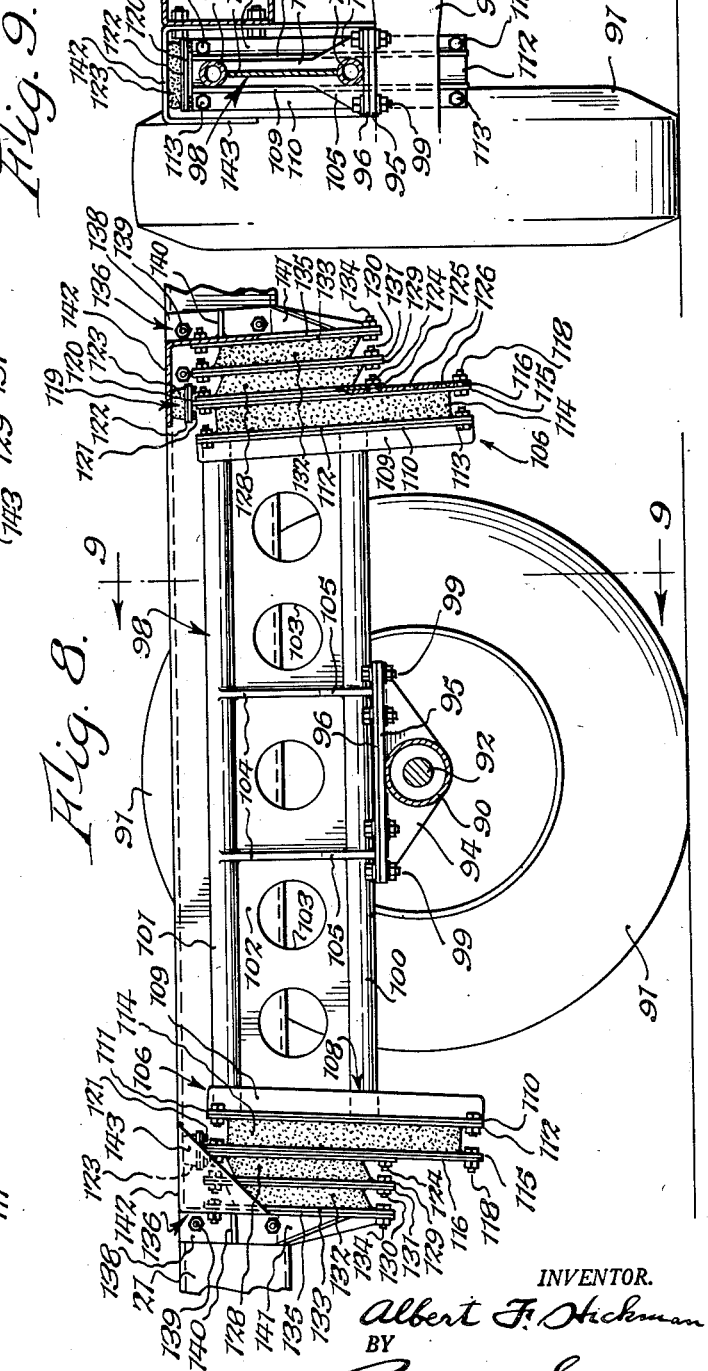
INVENTOR.
Albert F. Hickman
BY
Popp and Sommer
Attorneys.

March 22, 1955 A. F. HICKMAN 2,704,664
SPRING SUSPENSION FOR VEHICLES
Filed Dec. 7, 1951 5 Sheets-Sheet 5
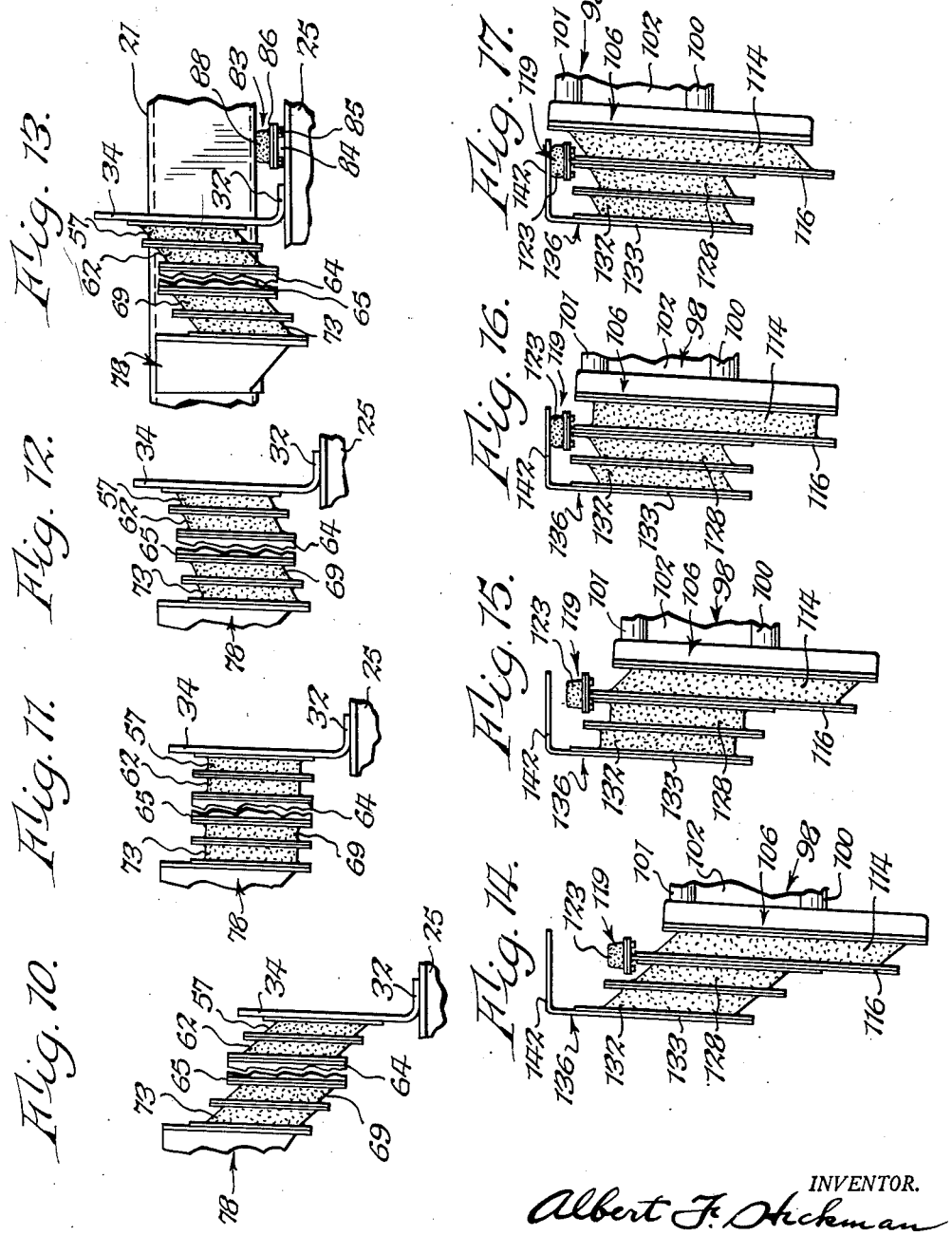
INVENTOR.
Albert F. Hickman
BY
Popp and Sommer
Attorneys.

United States Patent Office 2,704,664
Patented Mar. 22, 1955

2,704,664

SPRING SUSPENSION FOR VEHICLES

Albert F. Hickman, Eden, N. Y., assignor to Hickman Developments, Inc., Eden, N. Y., a corporation of New York Application December 7, 1951, Serial No. 260,463

3 Claims. (Cl. 267—63)

This invention relates to a spring suspension for vehicles of the shear rubber, rectilinear movement type and is more particularly shown in connection with a highway vehicle having a front steering axle and a single rear drive axle, although features of the invention can also be embodied in tandem axle trucks.

This application is a continuation in part of my copending applications for Spring Suspension for Vehicles, Serial No. 207,999, filed January 26, 1951, and Serial No. 213,194, filed February 28, 1951.

One of the important objects of the present invention is to provide a shear rubber, rectilinear movement type of spring suspension which will permit the large amount of vertical axle movement necessary with highway vehicles to provide a vertical ride as soft as load heights will allow and at a low frequency both when empty and under full load.

Another important object of the invention is to provide such a suspension which is free from friction but is automatically controlled by an increasing resistance to motion in proportion to the amplitude and velocity of vertical frame and wheel movement relative to each other.

Another object is to provide such a suspension in which lateral, vertical angular and a slight amount of longitudinal axle movements, with reference to the vehicle frame, are permitted and resiliently resisted, the lateral and angular resiliency being sufficient to absorb the lateral thrust of the axle, particularly resulting from one wheel moving up and down, thereby to provide increased safety, tire and gasoline mileage and stability, and the longitudinal resiliency being sufficient to eliminate detrimental vibrations due to rigidity of the axle lengthwise of the frame. The elimination of the axle rigidity vertically, longitudinally, and angularly with reference to the vehicle frame is requisite for maximum life of the frame, suspension, axle and tires as well as for maximum stability and safety and maximum economies in power and also preservation of the cargo.

Another important object is to provide such a suspension in which the resistance to such lateral or angular axle movement, with reference to the frame, is automatically controlled by an increasing resistance to motion in proportion to the amplitude and velocity of movement of the axle with reference to the frame.

Another object is, in single axle applications, the complete elimination of lubrication as well as the lubricant seals and the servicing incidental to parts requiring lubrication.

Another object is to provide such a suspension which will stand up without any servicing, repair or replacement, barring accident, for many years of service even under conditions of severe and constant use.

Another object is to provide such a suspension in which the frame is cradled and supported at well spaced points so as to reduce frame stresses.

Another object is to provide such a suspension which is very light in weight, particularly in unsprung weight, as compared with conventional suspensions.

Another object is to provide such a suspension in which very little shock absorber control is required.

Another object is to provide such a suspension consisting of compact units which can be arranged between each wheel and the frame without interference with vertical, lateral and vertical angular axle movement with respect to the frame.

Another object is to provide a suspension which provides a much wider base than that provided by conventional leaf springs.

Another object is to provide such a suspension which can be easily taken down and replaced.

Another most important object is to provide such a suspension which is low in cost, both as to initial cost and also upkeep, particularly as compared with conventional spring suspensions.

Another object is to provide such a suspension which renders radius rods or auxiliary devices for control of sidesway, such as torsion bar stabilizers, unnecessary, and at the same time adequately resists all brake and drive torque reactions.

Another object is to provide such a suspension in which periodic vibration of the suspension is dampened out and in which wheel tramp is avoided.

Another object is to provide a suspension which has a long and variable spring resistance range in both vertical, lateral and angular axle movements.

Another object is to provide such a suspension employing rubber blocks or bodies in rectilinear shear and in which the bond stress of the rubber is kept within safe working limits.

Another object is to provide a front or steering axle suspension which provides a much wider spring base than that provided with conventional leaf springs.

Another most important object of the invention is to provide, for the front or steering axle, such a suspension which permits the front or steering wheels to be turned or steered by turning the steering wheel, but which substantially prevents any lateral turning or steering movement of the steering wheels as a consequence of the vertical, lateral, angular or longitudinal movement of the front axle with reference to the vehicle frame.

Another object is to provide a front or steering axle suspension in which a greater vertical movement of the frame at a lower frequency, as compared with my said copending applications, is provided by an arrangement of the rectilinear movement shear rubber springs in direct tandem.

Another object is to provide a front or steering axle suspension in which bottoming of the suspension is yieldingly resisted by a rubber bumper directly between the frame and each end of the front axle.

Another object is to provide a rear or driving axle suspension in which a greater vertical movement of the frame at a lower frequency, as compared with my said copending applications, is provided both by an arrangement of the rectilinear movement shear rubber springs in direct tandem and also particularly when the vehicle is traveling light, by the selection and arrangement of rubber blocks or bodies of different effective cross sectional area.

Another object is to provide such a rear driving axle suspension in which the rubber blocks or bodies of lesser effective cross sectional area are cut out of effective service or bypassed when the axle moves a predetermined distance upwardly relative to the frame, thereby to avoid undue bond stress on these blocks and concentrating the load on the larger rubber blocks.

Another object is to provide such a rear or driving axle suspension in which the only flexible connection between the axle and the frame is provided by the rectilinear movement rubber shear springs acting from structures rigidly fixed to the driving axles to structures rigidly fixed to the frame.

Other objects and advantages of the present invention will be apparent from the following description and drawings in which:

Fig. 1 is a top plan view of a vehicle frame supported on a front steering axle and a rear drive axle by a spring suspension embodying the present invention, the suspension at the front end of the vehicle being shown in the empty truck or static no load condition and the suspension at the rear of the vehicle being shown in the full load condition of the parts.

Fig. 2 is a vertical section taken generally on line 2—2, Fig. 1, and showing the suspension and frame in elevation.

Fig. 3 is a fragmentary enlarged view similar to the left hand end of Fig. 2 and showing the parts of the suspension for the front or steering axle in greater detail.

Fig. 4 is a fragmentary vertical transverse section, taken on line 4—4, Fig. 3.

Fig. 5 is an enlarged fragmentary top plan view of the left hand end of Fig. 1 and showing in greater detail the parts of the suspension for the front or steering axle of the vehicle.

Fig. 6 is a fragmentary horizontal section taken on line 6—6, Fig. 3.

Fig. 7 is a fragmentary enlarged view similar to Fig. 1, with parts broken away, this view showing in greater detail the parts of the suspension for the rear or drive axle of the truck.

Fig. 8 is a fragmentary enlarged view, with parts broken away, of the rigth hand end of Fig. 2 and showing in greater detail the parts of the suspension for the rear or drive axle of the truck.

Fig. 9 is a vertical section taken generally on line 9—9, Fig. 8.

Figs. 10–13 are diagrammatic vertical side elevational views of one of the two series of rubber blocks or bodies connecting each end of the front or steering axle with the frame, Fig. 10 showing the condition of these bodies under free spring conditions, such as when the frame is jacked up, Fig. 11 when the truck is empty, Fig. 12 under full load, and Fig. 13 when bottoming under maximum shock load.

Figs. 14–17 are similar diagrammatic side elevational views of one of the two series of rubber blocks or bodies connecting each end of the rear or drive axle with the frame, Fig. 14 showing the condition of these blocks under free spring conditions, such as when the frame is jacked up, Fig. 15 when the truck is empty, Fig. 16 under full load, and Fig. 17 when bottoming under maximum shock load.

The main frame 20 of the vehicle can be of any suitable construction and is shown as comprising a pair of longitudinal side frame bars in the form of inwardly facing channels 21, which are shown as straight and parallel and as connected by cross bars 22. The entire vehicle chassis, together with its spring suspension, is constructed substantially symmetrically about a vertical longitudinal medial plane, and hence it is deemed sufficient to confine the following detailed description to the one (left) side of the vehicle, it being understood that this description and the same reference numerals apply to the opposite (right) side of the vehicle.

Referring more particularly to the suspension at the front end of the vehicle as illustrated in Figs. 1–6 and 10–13, the numeral 25 represents the steering axle of an axle structure, the axle being in the form of a I-beam, extending transversely of the frame 20. Each end of this axle is supported by a front steering wheel 26 which is supported on the axle 25 and moved by any conventional form of steering gear so as to be movable about a generally vertical axis A to the extreme two dotted line positions shown in Fig. 5 for steering the vehicle either to the right or to the left. The specific form of the steering gear is of no consequence so far as the present invention is concerned and the only part of the steering gear which is illustrated is the conventional steering drag link 27 (Figs. 3 and 4) the front end of which is connected by the usual ball and socket joint 28 with the usual actuating arm (not shown) of the stub shaft for the wheel and the rear end of which steering drag link 27 is connected by the usual ball and socket joint 29 to the lower end of the usual actuating arm 30 which is pivoted on the frame 20 for fore-and-aft movement.

Mounted on each end of the steering axle 25 are a pair of counterpart bracket parts which jointly form an inverted U-shaped axle bracket 31 mounted on the axle and the opening through which extends lengthwise of the vehicle. These counterpart bracket parts of the axle bracket 31 are provided at their lower ends with attaching flanges 32, 32a which project lengthwise of the axle 25 and are secured to its upper face by bolts 33 or in any other suitable manner. The upstanding parts 34, 34a of these parts of the axle bracket 31 diverge upwardly toward the adjacent wheel 26 and longitudinal side frame bar 21, respectively, and the upper ends of these sides are continued in the form of opposing top connecting portions 35, 35a which terminate in upstanding ears 36, 36a, respectively, these ears being arranged in face to face relation.

These ears 36, 36a of each axle bracket 31 are shown as joined together by the threaded stud 37 and nut 38 of a universal joint 40, the socket or knuckle 41 of which is formed at the forward end of an upper horizontal link or radius rod 43. The rear end of this upper radius rod or link 43 is secured to the frame through a similar universal joint 40 the threaded stud 37 of which is shown as extending through and secured by its nut 38 to the upstanding ear 44 of a frame bracket indicated generally at 45. Each of these frame brackets 45 is shown as secured to the corresponding outer frame side bar 21 by bolts 46 and each is provided with a depending ear 48.

Below each frame side bar 21 the axle 25 is provided with a bracket 50 having a rearwardly extending vertical ear 51 to which the forward end of a lower horizontal radius rod or link 43a is secured by a universal joint 40 identical with the other universal joints 40 previously described. A similar universal joint 40 connects the rear end of this lower radius rod or link 43a with the depending ear 48 of the axle bracket 45. These universal joints 40 permit vertical, angular, and lateral movement of the axle 25 with reference to the frame 20 and also preferably permit a limited horizontal movement of the axle 25 lengthwise of the frame 15 by the use of rubber bushings (not shown) in the universal joints 40 as described in greater detail in my said copending application Serial No. 207,999.

Outer rectangular metal plates 55, 55a are respectively secured by four corner bolts 56 to the opposing upwardly diverging faces of the upright sides 34, 34a of each axle bracket 31. To the opposing faces of each of these plates 55, 55a are vulcanized, respectively, a block or body 57, 57a of rubber, the opposing generally vertical surfaces of these bodies 57, 57a of rubber having vulcanized thereto rectangular intermediate plates 58, 58a. These rectangular intermediate plates 58, 58a are secured, as by rivets 59, to similar rectangular metal plates 60, 60a. To the opposing faces of each of these plates 60, 60a are vulcanized, respectively, blocks or bodies 62, 62a of rubber, the opposing generally vertical faces of these bodies of rubber 62, 62a having vulcanized thereto inner metal plates 63, 63a, respectively. The rectangular inner metal plates 63, 63a are parallel with the companion intermediate plates 58, 58a and 60, 60a and with the companion outer rectangular metal plates 55, 55a and since the upright sides 34, 34a of each axle bracket 31 diverge upwardly, it will be seen that the inner plates 63, 63a diverge upwardly relative to each other.

Each of these inner rectangular metal plates 63, 63a is respectively secured to the outer face of a channel plate 64, 64a, as by bolts 67, these channel plates having front and rear flanges 65, 65a along their front and rear edges. The flanges 65 project toward the adjacent wheel 26 and the flanges 65a project toward the adjacent side frame bar 21. These flanges 65, 65 also converge upwardly toward each other fore-and-aft of the frame and similarly the flanges 65a, 65a converge upwardly toward each other to the same degree as the flanges 64, 64.

Secured by four corner bolts 66 to the front pair of these upright flanges 65, 65a of each pair of inner metal channel plates 64, 64a is a front inner rectangular metal plate 68. Similarly secured by corner bolts 66 to the rear pair of these upright flanges 64, 64a is a rear inner metal plate 68a. Since the flanges 65, 65 converge upwardly toward each other to the same degree as the flanges 65a, 65a it will be seen that the front and rear inner plates 68 and 68a are disposed in planes which are parallel with the axle 20 but that these planes converge upwardly toward each other.

To the front face of the inner front plate 68 is vulcanized a block or body 69 of rubber and to the front face of this body of rubber is vulcanized an intermediate metal plate 70. This intermediate metal plate 70 is secured, as by rivets 71, to the metal plate 72 of an outer block or body of rubber 73 and to the outer face of which is vulcanized a rectangular outer metal plate 74. Similarly vulcanized to the rear face of the inner rear plate 68a is a block or body 69a of rubber and to the rear face of this body of rubber is vulcanized an intermediate metal plate 70a. This intermediate metal plate 70a is secured, as by rivets 71, to the metal plate 72a of an outer block or body of rubber 73a and to the outer face of which is vulcanized a rectangular outer metal plate 74a. The metal plates 70, 72 and 74 are parallel with the companion rectangular metal plate 68 and the rectangular metal plate 68a is parallel with the companion metal plates 70a, 72a and 74a and hence it will be seen that these two groups of rectangular metal plates converge upwardly relative to each other.

The rectangular outer metal plate 74 is secured by four corner bolts 76 to the flange 77 of a frame bracket 78, this flange projecting outwardly or toward the adjacent wheel 26 from an attaching portion 79 which is secured by four bolts 80 to the outer face of the adjacent side frame bar 21. The flange 77 is shown as reinforced by triangular ribs 81 and 82 connecting it with its attaching portion 79. Similarly the outer rectangular metal plate 74a is secured by four corner bolts 76 to the flange 77a of a frame bracket 78a, this flange projecting outwardly or toward the adjacent wheel 26 from an attaching portion 79a which is secured by four bolts 80 to the outer face of the adjacent frame side bar 21. The flange 77a is shown as reinforced by triangular ribs 81a and 82a connecting it with its attaching portion 79a. The opposing faces of the flanges 77, 77a converge upwardly toward each other parallel with the inner rectangular metal plates 68, 68a, respectively.

A feature of the invention resides in the use of a bottoming stop 83. As best shown in Figs. 4 and 13 this bottoming stop 83 comprises a bracket 84 welded or otherwise secured to the upper face of each end of the axle 25 below the corresponding side frame bar 21. On this bracket 84 is removably secured, as by screws 85, a top plate 86 to the upper face of which is vulcanized a rubber bumper 88. Under extreme downward movement of the frame 20 relative to the axle 25, as illustrated in Fig. 13, the side frame bars 21 engage and compress the rubber bumpers 88 thereby to prevent a metal-to-metal contact on bottoming and also to cushion such extreme movement of the suspension.

Referring more particularly to the suspension at the rear of the vehicle and illustrated in Figs. 1, 2, 7, 8, 9 and 14–17, the numeral 90 represents a drive axle housing supported by rear driving wheels 91 at its opposite ends, these wheels being fast to the usual pair of rear drive axles 92 connected by the usual differential contained in a differential housing 93 forming part of the drive axle housing.

In the form of the invention shown, on each end of the drive axle housing 90, externally of the corresponding side frame bar 21, is mounted an axle bracket 94 which can be secured in any suitable manner and includes a rectangular, horizontally disposed top plate 95 which is elongated lengthwise of the direction of movement of the vehicle or parallel with the adjacent side frame bar 21. This top plate 95 rigidly supports the bottom plate 96 of a rigid horizontal beam member or truss indicated generally at 98. The bottom plate 96 of the axle structure or truss 98 is preferably removably secured to the top plate 95 of the axle bracket 94 by bolts 99. The axle structure or truss 98 comprises a lower tube 100 welded to the bottom plate 96 to extend parallel with the adjacent side frame bar 21, an upper tube 101 arranged parallel with the lower tube 100 and a sheet metal web 102 connecting the tubes 100 and 101 and which, for lightness, can be provided with holes 103. A pair of vertical ribs 104 are welded to each side of each web 102 and to the tubes 100, 101. As best shown in Fig. 9, the lower end 105 of each of these webs enlarges and is welded to the bottom plate 96 of the truss so that the truss is laterally rigid and held in the upright position shown rigid with the axle.

As best shown in Figs. 7 and 8 the truss 98 is completed by two pairs of angle irons 106, the front ends of the tubes 100, 101 projecting between one pair of these angle irons 106 and being welded, as indicated at 108 to the face-to-face flanges 109 of these angle irons. Similarly the rear ends of the tubes 100, 101 project between the rear pair of these angle irons 106 and are welded to the face-to-face flanges 109 thereof. The other flanges 110 of each pair of these angle irons project outwardly relative to each other and are in coplanar relation and at a slight angle to the vertical such that the pair of angle irons 106 at the opposite end of the truss converge upwardly. It will be noted that the angle irons 106 extend a substantial distance below the lower horizontal tube 100 of the truss.

A vertically elongated rectangular metal plate 112 is secured to the external faces of the flanges 110 of each pair of angle irons 106 by bolts 113, these plates 112 thereby converging upwardly with reference to each other. To the face of each of these rectangular plates 112 opposite from the corresponding pair of angle irons 106 is vulcanized a pair of rubber blocks or bodies 114, these bodies being of large cross sectional area in a direction parallel with the corresponding rectangular plate 112. The opposite faces of each of these large rubber bodies 114 are vulcanized to a vertically elongated intermediate rectangular metal plate 115.

A rectangular metal plate 116 is secured by four corner bolts 118 to the rectangular metal plate 115. A feature of the invention resides in the provision of a bottoming bumper 119 at the upper end of this plate 116. For this purpose a horizontal plate 120 is welded or otherwise secured to the upper edge of this plate 116 and on this plate 120 is removably secured, as by screws 121, a plate 122 which carries a rubber bumper 123.

To the face of each plate 116 opposite the rubber body 114 is removably secured, as by four corner bolts 124, a rectangular metal plate 125, a series of vertically spaced holes 126 being preferably provided in the plate 116 for each of the corner bolts 124 so that the longer springs can be substituted in each series or so that the plate 125 can be mounted at different elevations with reference to the large rubber body 114.

To the face of each plate 125 opposite the rubber body 114 is vulcanized a rubber block or body 128, this rubber body being of relatively small cross sectional area, parallel with its plate 125, as compared with the large rubber body 114. A rectangular metal plate 129 is vulcanized to the face of each rubber body 128 opposite its rectangular metal plate 125, and each plate 129 is secured by corner bolts 130 to a similar rectangular metal plate 131. To the face of this rectangular metal plate 131 opposite the rubber body 128 is vulcanized another rubber block or body 132 which is shown as being of the same cross sectional size, parallel with its plate 131, as the rubber body 128. To the face of this rubber body 132 opposite its plate 131 is vulcanized an outer rectangular metal plate 133.

The rectangular outer metal plate 133 is secured by four corner bolts 134 to the flange 135 of a frame bracket 136, this flange projecting outwardly or toward the adjacent wheel 91 from an attaching portion 138 which is secured by a plurality of bolts 139 to the outer face of the adjacent frame side bar 21. The flange 135 is reinforced by triangular ribs 140, 141 connecting it with its attaching portion 138. Each frame bracket 136 is also provided with an integral rectangular metal top 142 forming a stop against which the rubber bumper 123 of the bottoming bumper 119 bottoms. Each frame bracket 136 is also provided with an outer vertical triangular metal plate 143, the upper and one vertical edge of which are secured to the top plate 142 and flange 135, respectively.

A feature of the invention resides in the form of all of the rubber blocks or bodies for both the front end and the rear end of the vehicle. Each rubber body or block has closely spaced opposite vertical faces arranged one above the other. Thus in each instance, in the unstressed condition of these rubber bodies they are each in the form of the cross sectional shape of a parallelogram in a vertical plane perpendicular to the rectangular metal plates to which the rubber body is vulcanized. Further the parallel upper and lower faces of each body incline upwardly and outwardly from the plate to which force is applied to the rubber and toward the plate from which the force is transmitted by the rubber body. Further, the rubber blocks or bodies are arranged at progressively higher elevations in the direction of transmission of force. Accordingly, in the unloaded condition of the vehicle the several rubber blocks or bodies at the front of the vehicle are of the parallelogram form and at the different elevations shown in Fig. 10 and similarly the several rubber blocks or bodies at the rear of the vehicle are of the parallelogram form shown in Fig. 14.

In the operation of the suspension at the front of the vehicle, illustrated in Figs. 1–6 and 10–13, the upward movement of one end of the steering axle 25, through the bracket 31, moves the outer plates 55, 55a upwardly. This stresses upwardly the outer or remote portions of the rubber bodies 57, 57a and hence distorts these rubber bodies or blocks upwardly. This upward force impressed upon these rubber bodies 57, 57a is transmitted through their metal plates 58, 58a to the metal plates 60, 60a to the rubber bodies 62, 62a. This stresses upwardly the outer or remote portions of the rubber body 62, 62a and this upward force impressed upon these rubber bodies 62, 62a is transmitted to the inner metal plates 63, 63a and, in turn, to the channel plates 64, 64a. Through the flanges 65, 65a of these channel plates this force is transmitted to the inner plates 68, 68a of the rubber bodies or blocks 69, 69a. This upward force impressed upon the rubber blocks or bodies 69, 69a is transmitted through their plates 70, 70a to the plates 72, 72a of the rubber bodies 73, 73a. This upward force impressed upon the rubber blocks or bodies 73, 73a is transmitted through the outer or remote plate 74, 74a vulcanized thereto and to the flanges 77, 77a of the two frame brackets 78, 78a and, in turn, to the corresponding side frame bar 21 of the frame.

It will be seen that each of the eight rubber bodies 57, 57a; 62, 62a; 69, 69a and 73, 73a is stressed upwardly in providing a resilient support for the corresponding frame corner, each of these rubber bodies having a rectilinear shear movement. It will further be seen that the four rubber blocks or bodies 57, 57a and 62, 62a are in series with the four rubber blocks or bodies 69, 69a and 73, 73a thereby to jointly provide the large amount of vertical axle movement necessary with highway vehicles to provide a vertical ride as soft as load heights will allow and at a low spring frequency at the front end of the truck.

Referring to Figs. 10–13, in the unloaded position of the truck the several rubber bodies at the front of the vehicle are distorted so as to be rectangular in cross section as illustrated in Fig. 11. When a full load is imposed upon the rubber bodies, the rubber bodies are distorted so as to each be in the form of a parallelogram in vertical section coincident with the direction of application of pressure as illustrated in Fig. 12. When each body is so stressed the slope of the parallelogram is opposite to that when the bodies are unstressed as illustrated in Fig. 10. the upper and lower faces of the rubber bodies inclining downwardly from the plate through which pressure is applied to the rubber body to the plate against which force is applied by the rubber body. Under extreme bottoming conditions, the several rubber bodies at the front of the suspension are further distorted as illustrated in Fig. 13 and also the rubber bumpers 88 on the axle 25 engage the side frame bars 21 so as to cushion the bottoming of the suspension.

It will be noted that the rubber blocks at the front of the vehicle also provide cushioned lateral and vertical angular axle movement with reference to the vehicle frame. Thus, when the axle 25 is moved laterally with reference to the frame, this force is transmitted through the axle brackets 31 and rubber blocks or bodies 57, 57a and 62, 62a to the channel metal plates 63, 63a. No substantial distortion of these rubber blocks occurs during this movement since under these forces these rubber blocks are merely placed under compression and not in shear. Since these rubber blocks are essentially shear springs they do not contribute to any substantial degree any resilient resistance to such movement of the axle laterally of the frame. However, this force is transmitted from the channel plates 64, 64a to the plates 63, 63a through their flanges 65, 65a to the other group of rubber bodies 69, 69a and 73, 73a and thence through the frame bracket 78, 78a to the frame 20. Since these rubber bodies 69, 69a and 73, 73a are disposed at right angles to the rubber bodies 57, 57a and 62, 62a it will be seen that such movement of the axle 25 laterally relative to the frame 20 impresses a horizontal shear force upon the four rubber bodies 69, 69a and 73, 73a. These rubber bodies thereby provide resilient resistance to the axle movement by distorting under such shear force.

The disposition of the group of rubber bodies 57, 57a and 62, 62a at right angles to the group of rubber bodies 69, 69a and 73, 73a provides a spring unit in the nature of a universal joint and hence angular movement of the axle 25 with reference to the vehicle frame is also resiliently resisted. Thus, when one end of the axle 25 rises with reference to the opposite end thereof to provide such angular movement of the axle with reference to the frame, the vertical component of such force is resiliently resisted by all eight of the rubber bodies 57, 57a, 62, 62a, 69, 69a, 73, 73a, and the horizontal component of such angular axle movement is resiliently resisted by the horizontal movement in shear of the rubber bodies 69, 69a, 73, 73a.

The four rubber blocks 57, 57a and 62, 62a are effective to yieldingly resist movement of the axle 25 longitudinally with reference to the vehicle frame. Thus, when the axle 25 moves longitudinally of the frame 20, the rubber blocks 57, 57a and 62, 62a are placed in shear and yield whereas the rubber blocks 69, 69a and 73, 73a are merely placed under compression and do not contribute much to yieldingly resist such axle movement. This longitudinal or fore-and-aft movement of the steering axle 25 with reference to the vehicle frame should be, of course, of very small degree but nevertheless is an important factor in a spring suspension to provide resilient resistance against all forces and to eliminate the transmission of sledge hammer blows from the axle to the frame as would be the case if the suspension had complete rigidity as against forces from any direction. This movement of the axle 25 longitudinally or fore-and-aft of the frame is restricted by the horizontal parallelogram links or radius rods 43, 43a, the universal joints 40 of these rods being preferably rubber bushed to permit of such movement of the axle 25.

During any extreme arcing or angular movement of these links or radius rods 43, 43a relative to the frame, the axle 25 is moved longitudinally of the frame to accommodate such arcing of these radius rods. This movement is accommodated principally by the four rubber blocks 57, 57a and 62, 62a which are in shear and to a much lesser degree by the other group of rubber blocks 69, 69a which are under compression.

Since the rubber blocks or bodies 57, 57a and 62, 62a are interposed between the upwardly divergent parallel surfaces of the sides 34, 34a of the axle bracket 31 and the channel plates 64, 64a, it will be seen that the upward movement of the axle bracket 31 effects a wedging action on these rubber blocks or bodies. Similarly since the rubber blocks or bodies 69, 69a and 73, 73a are interposed between the upwardly convergent parallel surfaces of the channel flanges 65, 65a and the flanges 77, 77a of the frame bracket 78, 78a it will be seen that upward movement of the axle 25 effects a wedging action on these rubber blocks or bodies. This wedging action for both groups of rubber bodies increases as the load increases. This wedging action greatly increases the load capacity of the rubber bodies vulcanized to their rectangular metal plates and through which plates the rubber bodies are secured to the frame brackets and axle bracket. This wedging action also eliminates the cost of an adjusting means for the degree of compression of the rubber bodies. It also simplifies the mounting problems by the elimination of such adjustment. It also improves the resistance curves of the springs in that it provides a resistance which is more nearly constant at the start of the action and increases, through compression of the rubber bodies, as the deflection increases.

It will also be noted that with the front end suspension shown, no substantial steering movement of the wheels 26 takes place as a consequence of axle movement and that the compactness of each rubber spring unit at each end of the steering wheel permits the unit to be interposed between the frame and the corresponding steering wheel and still not interfere with the movement of the steering wheel in making short turns. Thus, on referring to Fig. 5, it will be seen that the rubber spring unit is compact enough to permit very sharp turning of the corresponding steering wheel, the unit actually being compact enough to enter the inside diameter of the steering wheel.

In the operation of the suspension at the rear end of the vehicle illustrated in Figs. 1, 2, 7, 8, 9 and 14–17, in the free spring condition of the body such as when the body is jacked up, the rubber bodies and other parts are in the position illustrated diagrammatically in Fig. 14 in which the upper and lower faces of each rubber body inclines upwardly from the plate through which pressure is applied to each rubber body to the plate against which pressure is applied by that rubber body.

When the vehicle is empty a downward force is transmitted by the empty body from the frame brackets 136 successively through each group of rubber bodies 132, 128 and 114 to the corresponding end of each axle structure or truss 98 and thence to the axle bracket 94, axle housing 90 and wheels 91. Since the rubber bodies 132 and 128 are of relatively small effective cross section, that is, in a direction parallel with the plates to which these rubber bodies are bonded, with the body unloaded the distortion of these smaller rubber bodies is greater than the larger rubber body 114. Accordingly, in the static no load condition of these rubber bodies, as illustrated in Fig. 15, the smaller rubber bodies 132 and 128 are brought to a rectangular form in a plane coincident with the application of pressure whereas the larger rubber bodies 114 are distorted to only a slight degree. Since the small rubber bodies 132 and 128, particularly when arranged in tandem as shown, provide a high degree of deflection for a given load, these rubber bodies provide a desired low spring frequency when the vehicle is traveling empty or lightly loaded.

When the vehicle is loaded, the smaller rubber bodies 132 and 128 flex to a further extent and so that their upper and lower faces incline downwardly from the plate to which pressure is applied to each rubber body to the plate against which pressure is applied by the rubber body. This position of these smaller rubber bodies 132 and 128, which represents the maximum force which can be applied to them, is illustrated in Fig. 16. This maximum stress on the two small rubber bodies 128 and 132 is limited by the rubber bumpers 119 which at this time contact the upper stop plates 142 of the axle brackets 136. Since each rubber bumper 119 is mounted on the plate interposed between each large rubber body 114 and the pair of tandem smaller rubber bodies 128 and 132, it will be seen as shown in Fig. 16, that further downward pressure of the body against the axles is transmitted from the top plate 142 of each axle bracket 136 through the corresponding rubber bumper 119 to the plate 116 fastened to the corresponding large rubber body 114 and hence that excessive downward forces of the vehicle body bypass the pairs of smaller rubber bodies 128 and 132.

When maximum shock load conditions are encountered, the forces are accordingly absorbed jointly by the rubber bumper 119 which is distorted or squashed to a greater degree, as illustrated in Fig. 17, but principally by distortion of the large rubber bodies 114. Under such maximum shock load conditions these large rubber bodies flex to the cross sectional shape shown in Fig. 17 and provide the necessary resilient resistance to maximum forces of the frame against the axle.

It will be seen that the lighter bodies 128, 132, because of their much smaller effective cross sectional area as compared with the large rubber bodies 114 and especially when arranged in tandem as shown, readily flex under light load conditions and under light impacts to provide the desired ride when the truck is traveling empty or lightly loaded. The amplitude of axle movement permitted by these light rubber bodies under light load conditions provides a low frequency at the rear end of the conventional trucks when empty.

When the truck is loaded, however, and subjected to load impacts these light rubber bodies 128 and 132 are prevented from being overstressed and are cut out of service by engagement of the bumpers 119 with the axle brackets 136 which positively limit the downward movement of the plate 116 and hence the amount of force which can be impressed on these light rubber bodies 128 and 132 and the degree of distortion and bond stress thereof.

Accordingly, when the truck is fully loaded, further downward impacts of the frame at each end of the axle housing 90 are yieldingly resisted by the main rubber bodies 114 and under such conditions these rubber bodies provide a low ride frequency for the loaded truck.

It will be noted that the several rubber bodies 114, 128, 132 permit laterally cushioned movement of the axle housing 90 relative to the frame 20. Since these rubber bodies are shear springs and since they are arranged with their shear planes parallel with the axis of the rear axle, it will be seen that the movement of the axle housing 90 in the direction of its axis or laterally of the frame is permitted and yieldingly resisted by these rubber bodies. Such yield of the rubber bodies is also sufficient to enable each axle structure or truss 98 to be rigidly fixed to the axle housing 90, as shown.

Angular movement of the axle housing 90, that is, when one wheel 91 rises relative to the opposite wheel, is also resiliently resisted by the rubber bodies 114, 128, 132. Thus, the vertical component of such angular movement is resisted essentially by the light or smaller rubber bodies 128, 132 under light load and impact conditions and by the main or large rubber bodies 114 under heavy load or impact conditions in the same manner as previously described for vertical axle movement. Similarly the horizontal component of such angular axle movement is resisted essentially by the light or small rubber bodies 128, 132 under light load and impact conditions and by the main or large rubber bodies 114 under heavy load or impact conditions in the same manner as previously described for lateral axle movement relative to the frame.

The rubber bodies 114, 128 and 132 also permit a limited movement of the axle housing 90 longitudinally of the frame 20. While these are essentially shear springs acting at right angles to such axle movement, the optimum axle movement lengthwise of the frame is very small, in the order of a small fraction of an inch and these blocks compress to provide such small movement. Some such resiliently permitted movement is essential, however, as against sledge hammer blows of the axle housing 90 lengthwise of the frame and to provide some degree of flexibility in all directions.

Since the rubber blocks 114, 128 and 132 are interposed between the upwardly converging plates 112 and 133, it will be seen that the downward movement of the frame brackets 136 effects a wedging action on these rubber blocks or bodies. This wedging action increases as the load increases. This wedging action greatly increases the load capacity of the rubber bodies vulcanized to their rectangular metal plates and through which the rubber bodies are secured to the frame brackets and axle structure or truss 98. This wedging action also eliminates the cost of an adjusting mechanism for the initial stress imposed upon the rubber bodies and simplifies the mounting problems by the elimination of such adjustment. It also improves the resistance curve of the suspension at the rear of the body since the resistance is more nearly constant at the start of deflection and increases, through compression of the rubber bodies, as the deflection increases.

With the suspension at both ends of the frame lubrication requirements are entirely eliminated in the suspension, and the suspension is designed to stand up under conditions of severe and constant use, regardless of atmospheric, climatic, road or type of load conditions, at least five years without service. Salt, road dust and weather conditions will not substantially affect the action of the suspension. Oil will slightly affect the rubber bodies if made of natural rubber, but only the extreme outer portions thereof and will not go deep enough to cause any substantial damage within a five year period.

The spring suspension is also very light in weight as compared with conventional spring suspensions, particularly in unsprung weight. With the present trend toward legal load limits, any weight saving in the vehicle is valuable. However, unsprung weight is almost doubly important. It costs power and loss of load capacity to carry unnecessary weight and it costs at least double in power to carry unnecessary unsprung weight.

It will be noted that by the arrangement of two groups of four rubber bodies 57, 62, 69 and 73, and 57a, 62a, 69a and 73a, in tandem for each end of the front or steering axle, a high degree of vertical movement of the frame 21 is provided at the front thereof, thereby to provide a low spring frequency. Similarly, by the arrangement of two groups of three rubber bodies 114, 128 and 132 in tandem for each end of the rear or drive axle, a high degree of vertical movement of the frame 21 is provided at the rear thereof, thereby to provide a low spring frequency.

It will also be seen that the bottoming of the front of the frame 20 is resilient, through the rubber bumpers 88, and that the truss or axle structure 98 at the rear of the frame is rigid with the axle 90 so as to simplify the construction and reduce the cost of maintenance thereof.

While the stop 142 and rubber bumper 123 are shown as on the frame structure 20 and plate 116, respectively, it is apparent that they could be on the axle structure 98 and plate 116, respectively, with the stop 142 arranged below the plate 116.

By "rubber" as used in the accompanying claims is meant both natural rubber and also synthetic rubber and mixtures of natural and synthetic rubber.

I claim:

1. A vehicle spring suspension adapted to be interposed between the frame of a highway vehicle and an axle having a wheel journalled thereon, comprising an axle bracket rigidly fixed to said axle adjacent said wheel, a frame bracket rigidly fixed to said frame in advance of said wheel, a second frame bracket rigidly fixed to said frame in rear of said wheel, the spacing of said frame brackets being greater than the diameter of said wheel, a rubber block secured to each of said frame brackets in position to permit vertical flexure of said blocks, a rigid horizontal beam member rigidly fixed to be immobile with reference to said axle bracket and extending lengthwise of said frame adjacent said frame brackets, and means securing each end of said rigid horizontal beam member to the corresponding rubber block whereby said rubber blocks resilient support said frame on said axle structure and axle.

2. A vehicle spring suspension adapted to be interposed between the frame of a highway vehicle and an axle having a wheel journalled thereon, comprising an axle bracket rigidly fixed to said axle adjacent said wheel, a frame bracket rigidly fixed to said frame in advance of said wheel, a second frame bracket rigidly fixed to said frame in rear of said wheel, the spacing of said frame brackets being greater than the diameter of said wheel and the opposed sides of said frame brackets inclining upwardly and inwardly toward each other, a rigid horizontal beam member interposed between said opposed sides of said frame brackets and having complementary upwardly and inwardly extending sides each arranged in opposed mating relation with said opposed side of a corresponding frame bracket, means rigidly connecting said rigid horizontal beam member to be immobile with reference to said axle bracket, and a rubber block interposed and connected to each pair of complementary upwardly and inwardly extending sides of said axle structure and frame brackets.

3. A vehicle spring suspension adapted to be interposed between the frame of a highway vehicle and an axle having a wheel journalled thereon, comprising a frame bracket rigidly fixed to said frame in advance of said wheel, a second frame bracket rigidly fixed to said frame in rear of said wheel, the spacing of said frame brackets being greater than the diameter of said wheel and the opposed sides of said frame brackets inclining upwardly and inwardly toward each other, a horizontal plate rigidly fixed to said axle, a tube rigidly fixed to said plate to extend lengthwise of said frame and interposed between said frame brackets, a second tube spaced vertically from said first tube and arranged parallel therewith and interposed between said frame brackets, a vertical web rigidly connecting said tubes, members rigidly fixed to the opposite ends of said tubes and inclining upwardly and inwardly toward each other and each arranged in opposed mating relation with said opposed side of a corresponding frame bracket, and a rubber block interposed between each of said members and the side of the corresponding frame bracket.

References Cited in the file of this patent

UNITED STATES PATENTS

| | | |
|---|---|---|
| 1,147,865 | Hunt | July 27, 1915 |
| 2,137,543 | Piron | Nov. 22, 1938 |
| 2,141,165 | Armington | Dec. 27, 1938 |
| 2,165,702 | Haushalter | July 11, 1939 |
| 2,211,463 | Hobson | Aug. 13, 1940 |
| 2,236,686 | Jackson | Apr. 1, 1941 |
| 2,264,702 | Lathshaw | Dec. 2, 1941 |
| 2,286,563 | Mussey | June 16, 1942 |

FOREIGN PATENTS

| | | |
|---|---|---|
| 352,467 | Italy | Sept. 15, 1937 |
| 496,035 | Great Britain | Nov. 23, 1938 |
| 648,516 | Great Britain | Jan. 3, 1951 |